United States Patent [19]

Ejk et al.

[11] Patent Number: 4,726,928

[45] Date of Patent: Feb. 23, 1988

[54] RADIATION-RESISTANT VINYL HALIDE RESIN COMPOSITIONS AND A PROCESS FOR THEIR PRODUCTION

[75] Inventors: Adam J. Ejk, Florence; Mark A. Jachym, East Brunswick, both of N.J.

[73] Assignee: American Hoechst Corporation, Somerville, N.J.

[21] Appl. No.: 854,690

[22] Filed: Apr. 18, 1986
(Under 37 CFR 1.47)

Related U.S. Application Data

[60] Division of Ser. No. 551,803, Nov. 15, 1983, abandoned, which is a continuation-in-part of Ser. No. 448,678, Dec. 10, 1982, abandoned.

[51] Int. Cl.$^4$ ............................................... A61L 2/00
[52] U.S. Cl. .................................................... 422/22
[58] Field of Search ........................ 524/114, 180, 568; 523/136; 422/22

[56] References Cited

U.S. PATENT DOCUMENTS

| | | | |
|---|---|---|---|
| 2,956,899 | 10/1960 | Cline | 427/36 |
| 3,640,953 | 2/1972 | Brecker et al. | 524/180 |
| 3,706,679 | 12/1972 | Hopton et al. | 524/180 |
| 3,925,246 | 12/1975 | Coates et al. | 524/180 |
| 3,978,023 | 8/1976 | Coates et al. | 524/180 |
| 4,064,296 | 12/1977 | Bornstein et al. | 427/36 |
| 4,129,536 | 12/1978 | Martin et al. | 524/180 |
| 4,159,261 | 6/1979 | Dieckmann | 524/180 |
| 4,193,913 | 3/1980 | Abeler | 524/180 |
| 4,217,258 | 8/1980 | Minagawa et al. | 524/180 |
| 4,379,878 | 4/1983 | Larkin | 524/180 |
| 4,496,490 | 1/1985 | Larkin | 524/180 |

FOREIGN PATENT DOCUMENTS

| | | | |
|---|---|---|---|
| 0205173 | 12/1983 | Fed. Rep. of Germany | 524/180 |
| 0042611 | 10/1972 | Japan | 524/180 |
| 0048228 | 4/1980 | Japan | 524/180 |
| 0125142 | 9/1980 | Japan | 524/180 |
| 0125144 | 9/1980 | Japan | 524/180 |
| 0061448 | 5/1981 | Japan | 524/180 |
| 6118442 | 9/1981 | Japan | 524/180 |
| 1448951 | 9/1976 | United Kingdom | 524/180 |
| 2076409 | 12/1981 | United Kingdom | 524/180 |

*Primary Examiner*—Joseph L. Schofer
*Assistant Examiner*—J. M. Reddick
*Attorney, Agent, or Firm*—Richard S. Roberts; Michael J. Tully

[57] ABSTRACT

Resinous compositions that are stabilized against the deteriorative effect of gamma and other ionizing radiation comprises a vinyl halide resin, from 2% to 4% by weight, based on the weight of the vinyl halide resin, of an organotin mercaptoacid ester, and an epoxy compound in the amount of from 3 parts to 5 parts by weight of the epoxy compound per part by weight of the organotin mercaptoacid ester.

The stabilized vinyl halide resin compositions can be used in the aseptic packaging of foods and other perishable materials.

6 Claims, No Drawings

RADIATION-RESISTANT VINYL HALIDE RESIN COMPOSITIONS AND A PROCESS FOR THEIR PRODUCTION

This is a divisional of co-pending application Ser. No. 551,803 filed on Nov. 15, 1983 which was a continuation-in-part of co-pending application Ser. No. 448,678 filed Dec. 10, 1982, both now abandoned This invention relates to radiation-resistant vinyl halide resin compositions and to a process for their production. More particularly, it relates to gamma and other ionic radiation-resistant vinyl halide resin compositions that can be used in the aseptic packaging of foods, drugs, medical articles such as syringes and hypodermic needles, and the like.

Aseptic packaging of foods and other products has been developed as a low-cost, refrigeration-saving method of preserving the products and/or protecting them against contamination and spoilage caused by microorganisms.

In aseptic packaging procedures, packages containing the product may be subjected to sterilization, or a cold sterile product may be deposited in a presterilized package which is then closed or sealed under aseptic conditions.

The methods that are used to sterilize the product and the package are limited to a considerable extent by the type of product being packaged and the choice of packaging material. The most commonly-used sterilization methods include heat treatment, the use of chemical sterilants, and exposure to ionic radiation. Each of these methods has disadvantages that limit its use. Heat sterilization can be used only with those products whose taste, odor, and color are not adversely affected by such treatment. When chemical sterilants are used, care must be taken to avoid leaving in the packages chemical residues that may be toxic or that may cause degradation of the packaging material with release of toxic materials. Exposure to ionic radiation is an excellent and efficient method of sterilizing medical articles and perishable products and certain packaging materials. Heretofore, however, it has not been possible to use unstabilized vinyl halide resin compositions as the packaging material in the aseptic packaging of products that are to be sterilized by ionic radiation because when exposed to the amount of radiation that is necessary to sterilize the products the vinyl halide resin compositions deteriorate rapidly, as is shown by their discoloration and embrittlement.

In accordance with this invention, it has been found that vinyl halide resin compositions that are characterized by excellent resistance to gamma radiation and other ionic radiation, excellent impact strength, early color, and other valuable properties result when certain stabilizers are incorporated into the compositions.

The stabilizers of this invention are thoroughly compatible with vinyl halide resins and the other components of the resinous compositions, and they can be readily blended with these materials to form compositions that are resistant to deterioration resulting from exposure to gamma and other ionic radiation.

These stabilizers contain a major amount of an epoxy compound and a minor amount of an organotin mercaptoacid ester. While all of the epoxy compounds and organotin mercaptoacid esters disclosed hereinafter are useful as components of stabilizers that will impart resistance to radiation and other valuable physical and mechanical properties to the vinyl halide resin compositions, only those that have been granted government approval for use in food-packaging are recommended for use in the non-toxic stablizers and stabilized compositions of this invention.

The epoxy compounds that can be used in the stabilized resinous compositions of this invention contain one or more oxirane groups and 15 to 80 carbon atoms. A preferred group of epoxy compounds consists of esters of epoxidized fatty acids having 14 to 22 carbon atoms. Illustrative of these compounds are epoxidized cottonseed oil, epoxidized linseed oil, epoxidized olive oil, epoxidized coconut oil, methyl epoxystearate, butyl epoxystearate, tridecyl epoxystearate, butyl epoxymyristate, butyl epoxypalmitate, oxtyl epoxytallate, and mixtures thereof. Other non-toxic epoxy compounds can be used alone or in combination with an ester of an epoxidized fatty acid. The organotin compounds that may be present in the stabilized compositions of this invention have the formula

wherein R represents an alkyl group having 1 to 8 carbon atoms, R' represents an alkylene group having 1 to 4 carbon atoms; R" represents an alkyl, aryl, alkaryl, or aralkyl group having from 1 to 18 carbon atoms or from 2 to 18 carbon atoms; and x and y represent numbers in the range of 1 to 3 whose total is 4. Illustrative of the compounds are the following:

methyltin tris (isobutyl mercaptoacetate)
dimethyltin bis (isobutyl mercaptoacetate)
trimethyltin (isobutyl mercaptoacetate)
methyltin tris (isohexyl mercaptoacetate)
methyltin tris (isooctyl mercaptopropionate)
methyltin tris (octadecyl mercaptopropionate)
methyltin tris (phenyl mercaptobutyrate)
butyltin tris (isooctyl mercaptoacetate)
dibutyltin bis (isooctyl mercaptoactate)
dibutyltin bis (isooctyl mercaptopropionate)
dibutyltin bis (isooctyl mercaptobutyrate)
dibutyltin bis (octadecyl mercaptoacetate)
tributyltin (isooctyl mercaptoacetate)
tributyltin (decyl mercaptopropionate)
tributyltin (phenyl mercaptoacetate)
tributyltin (benzyl mercaptoacetate)
octyltin tris (isooctyl mercaptoacetate)
octyltin tris (isooctyl mercaptobutyrate)
octyltin tris (tetradecyl mercaptoacetate)
dioctyltin bis (isooctyl mercaptopropionate)
dioctyltin bis (phenyl mercaptoacetate)
dioctyltin bis (hexadecyl mercaptoacetate)
dioctyltin bis (xylyl mercaptoacetate)
dioctyltin bis (tetradecyl mercaptoacetate)
di (2-ethylhexyl)tin bis (hexyl mercaptoacetate)
trioctyltin (isooctyl mercaptoacetate)
trioctyltin (dodecyl mercaptoacetate)
trioctyltin (phenyl mercaptopriopionate)
trioctyltin (cresyl mercaptopropionate) and the like
and mixtures thereof.

When the stabilized vinyl halide resin compositions are to be used for food or drug packaging, the organotin compound that is used is preferably a dioctyltin bis (alkyl mercaptoacetate) having the formula

wherein R''' is an alkyl group having 1 to 12 carbon atoms, preferably 6 to 10 carbon atoms. These compounds include dioctyltin bis (methyl mercaptoacetate), dioctyltin bis (butyl mercaptoacetate), dioctyltin bis (2-ethylhexyl mercaptoacetate), dioctyltin bis (n-octyl mercaptoacetate), dioctyltin bis (isooctyl mercaptoacetate), dioctyltin bis (decyl mercaptoacetate), dioctyltin bis (dodecyl mercaptoacetate), and the like and mixtures thereof. The dioctyltin bis (octyl mercaptoacetates) are preferred.

The stabilizers of this invention comprise an epoxy compound and an organotin mercaptoacid ester in the amounts of about 3 parts to about 5 parts by weight of the epoxy compound per part by weight of the organotin compound. Resinous compositions having the best combination of resistance to ionizing radiation, impact strength, and early color result when the stabilizer contains about 4 parts by weight of the epoxy compound per part by weight of the organotin compound. Compositions that contain stabilizers in which there is less than about 3 parts by weight of the epoxy compound generally have unsatisfactory resistance to gamma and other ionic radiation; those that contain more than about 5 parts by weight per part by weight of the organotin compound do not have the desired physical and mechanical properties.

Stabilizers suitable for use in the production of radiation resistant vinyl halide resin compositions that are useful as food and drug packaging materials comprise an ester of epoxidized fatty acids having 14 to 22 carbon atoms and an organotin compound of the formula

(C$_8$H$_{17}$)$_2$ Sn(SCH$_2$COOR''')$_2$ wherein R''' is an alkyl group having 1 to 12 carbon atoms in the amounts of about 3 parts to about 5 parts by weight of the epoxy ester per part by weight of the organotin compound. They preferably contain 20% to 25% by weight of dioctyltin bis (isooctyl mercaptoacetate) and 75% to 80% by weight of epoxidized soybean oil.

Only a small amount of one of the stabilizers of this invention need be incorporated into a vinyl halide resin composition to impart to it effective resistance to gamma and other ionic radiation. In most cases, the amount of the stabilizer used is that which will provide from 2% to 4%, based on the weight of the vinyl halide resin, of the organotin compound. Best results have been obtained when the stabilized resinous composition contained 2% to 3% by weight of the organotin compound and 10% to 15% by weight of the epoxy compound, based on the weight of the vinyl halide resin.

The stabilizers of this invention are of particular value in the stabilization of rigid polyvinyl chloride compositions, that is, compositions that are formulated to withstand temperatures of at least 175° C., for example, the pigmented compositions used in the production of pipe. Such compositions generally contain not more than 10% by weight of one or more conventional plasticizers. They may also be used in semi-rigid vinyl halide compositions. The vinyl halide resins that may be employed in such compositions include both vinyl halide homopolymers, such as polyvinyl chloride, polyvinyl bromide, and polyvinylidene chloride, and copolymers formed by the polymerization of vinyl halide with up to about 30 percent of a comonomer such as vinyl acetate, vinyl butyrate, vinylidene chloride, ethylene, propylene, ethyl acrylate, methyl methacrylate, styrene, and the like.

The stabilizer components may be incorporated into the vinyl halide resin composition by any suitable and convenient procedure. For example, they may be combined to form a stabilizer that comprises from about 3 to about 5 parts by weight of an epoxy compound per part by weight of an organotin compound and the resulting stabilizer incorporated in the vinyl halide composition in an amount that will provide from about 2% to 4%, based on the weight of the vinyl halide resin, of the organotin compound. Alternatively, appropriate amounts of the epoxy compound and the organotin compound may be added separately to the vinyl halide resin composition.

In addition to the vinyl halide resin and stabilizer, the radiation-resistant composition of this invention may contain such conventional resin additives as pigments, dyes, processing aids, lubricants, impact modifiers, fillers, and extenders in the amounts ordinarily employed for the purposes indicated. The stabilized vinyl halide resin compositions may be prepared, for example, by mixing the ingredients on a two-or three- roll mill, by blending in a mixer such as a Henschel blender, or by tumbling. The resulting compositions may be further processed by injection molding, extrusion, calendering, etc.

Any effective source of ionizing radiation may be used to sterilize the vinyl halide resin compositions of this invention or products that are packaged in these compositions. For example, a high energy electron accelerator of the Van de Graaff type may be used. Other suitable sources of ionic radiation include gamma radiation and X-rays. Sterilization procedures using gamma radiation or other ionizing radiation are quite desirable because they are carried out at ambient temperature and require only short treatment periods.

The dosage of radiation that is required is that which will effect the desired level of sterilization. In most cases, a dosage of 2 to 5 megarads is employed.

The invention is further illustrated by the following examples. In these examples, all parts are parts by weight and all percentages are percentages by weight.

EXAMPLES 1–3

A series of polyvinyl chloride compositions was prepared by mixing together the materials shown in Table I in a Henschel blender at 3000 rpm at a temperature between 60° C. and 90° C. until a uniform composition was obtained. The resulting mixtures were charged to a two-roll mill, milled for 5 minutes, and then removed from the mill as sheets that were either 10 mils or 15 mils thick.

TABLE I

|  | Examples | | | Comparative |
|---|---|---|---|---|
|  | 1 | 2 | 3 | Example |
|  | | | Parts | |
| Polyvinyl Chloride | 100 | 100 | 100 | 100 |
| Impact Modifier-MBS Type | 15.0 | 14.0 | 15.0 | 8.3 |
| Acrylic Processing Aid | 1.8 | 1.7 | 1.8 | 2.0 |
| Lubricating Processing Aid | — | — | — | 1.0 |
| Complex Ester Lubricants | 2.0 | 2.0 | 2.0 | 1.4 |
| Dioctyltin bis (isooctyl mercaptoacetate) | 2.5 | 3.1 | 3.1 | 2.0 |
| Epoxidized Soybean Oil | 10.0 | 12.5 | 12.5 | — |
| Talc | — | — | — | 0.1 |

TABLE I-continued

| | Examples | | | Comparative Example |
|---|---|---|---|---|
| | 1 | 2 | 3 | |
| | | Parts | | |
| Montan Wax | — | — | — | — |

EXAMPLE 4

Samples of the products of Example 1 and the Comparative Example were exposed to gamma radiation at the level of 2.5 megarads or 5.0 megarads and then evaluated by conventional test methods. For comparative purposes, samples of the non-irradiated products of Example 1 and the Comparative Example were included in the tests. The results obtained are summarized in Table II.

TABLE II

| | Gamma Radiation Level (megarads) | | |
|---|---|---|---|
| Impact Resistance (ASTM D-256) Izod Impact (ft. lb./inch) | 0 | 2.5 | 5.0 |
| Product of Ex. 1 | | | |
| 10 mils | 1.5 | 2.0 | 5.0 |
| 15 mils | 1.5 | 2.1 | 5.1 |
| Product of Comp. Ex. | | | |
| 10 mils | 2.9 | 2.7 | 2.5 |
| Deflection Temperature (ASTM D-648) (°C. at 264 psi) | | | |
| Product of Ex. 1 | | | |
| 10 mils | 47.3 | 48.5 | 54.5 |
| 15 mils | 47.3 | 52.6 | 57.3 |
| Product of Comp. Ex. | | | |
| 10 mils | 64.8 | 63.3 | 63.3 |
| Color Evaluation (Macbeth 1500 Colorimeter) Differential from Standard-Macadam Units | | | |
| Product of Ex. 1 | | | |
| 10 mils | — | 4.1 | 10.5 |
| 15 mils | — | 9.2 | 22.5 |
| Product of Comp. Ex. | | | |
| 10 mils | — | 42.7 | 77.5 |
| 15 mils | — | 63.2 | 83.7 |

From the data in Table II, it will be seen that the properties of the product of Example 1, namely the impact strength and the heat distortion properties, improved dramatically with increased dosage of gamma radiation, whereas those of the comparative product remained substantially unchanged when it was exposed to gamma radiation. In addition, the colors of both the irradiated product and the non-irradiated product of Example 1 were much lighter and more stable than those of the corresponding comparative products.

EXAMPLES 5 AND 6

Stabilizers were prepared by mixing together the materials shown in Table III until a homogeneous composition was obtained.

When each of these stabilizers was incorporated into a polyvinyl chloride composition in amounts that provided 2.5 parts by weight by dioctyltin bis (isooctyl mercaptoacetate) per 100 parts by weight of polyvinyl chloride, and the resulting compositions were evaluated by standard test methods, the results obtained were equivalent to those reported in Example 4 for the product of Example 1.

TABLE III

| | Example | |
|---|---|---|
| | 5 | 6 |
| Dioctyltin bis (isooctyl mercaptoacetate) | 2.5 parts | 3.0 parts |
| Epoxidized soybean oil | 10.0 | 12.5 |

Each of the other organotin compounds and epoxy compounds disclosed herein may be used in a similar manner to form stabilizers that will protect vinyl halide resin compositions from degradation resulting from exposure to ionizing radiation.

What is claimed is:

1. A method of sterilizing a packaging material comprising
   (I) providing a packaging material comprising a resinous composition consisting essentially of a mixture of:
      (a) a vinyl halide resin;
      (b) an organotin mercaptoacid ester having the formula $$R_xSn(SR'COOR'')_y$$

wherein:
      R represents an alkyl group having 1-8 carbon atoms, R' represents an alkylene group having 1 to 4 carbon atoms; R'' represents an alkyl, aryl, alkaryl or aralkyl group having 1 to 18 carbon atoms, and x and y represent numbers in the range of 1 to 3 whose total is 4; and
      (c) an epoxy compound; said organotin mercaptoacid ester and said epoxy compound being present in an amount effective to stabilize said composition against the deteriorative effects of ionizing radiation wherein said epoxy compound is present in an amount of from about 3 to about 5 parts by weight precent by weight of said organotin mercaptoacid ester; and
   (II) subjecting said material to ionizing radiation for a period of time sufficient to substantially sterilize said packaging.

2. The method of claim 1 wherein said epoxy compound comprises one or more compounds selected from the group consisting of epoxidized cottonseed oil, epoxidized linseed oil, epoxidized olive oil, epoxidized coconut oil, methyl epoxystearate, butyl epoxystearate, tridecyl epoxystearate, butyl epoxymyristate, butyl epoxypalmitate, oxtyl epoxytallate, and mixture thereof.

3. The method of claim 1 wherein said packaging is made from a resinous composition comprising a mixture of:
   (a) a vinyl halide resin;
   (b) an organotin compound having the formula $(C_8H_{17})_2$ $$Sn(SCH_2COOR''')_2$$

wherein:
      R''' is an alkyl group having 1 to 12 carbon atoms, and,
   (c) an ester of epoxidized fatty acids having 14 to 22 carbon atoms.

4. The method of claim 3 wherein said organotin compound is present in said vinyl halide resin at a level of about 2% to 4% by weight based on said vinyl halide resin and said epoxidized fatty acid ester is present at a level of about 3 to 5 parts by weight per part by weight of said organotin compound.

5. The method of claim 4 wherein said organotin compound comprises dioctyltin bis (isooctyl mercaptoacetate).

6. The method of claim 5 wherein said ionizing radiation is gamma radiation applied at a dosage of about 2 to 5 megarads.

* * * * *